(12) United States Patent
Slais et al.

(10) Patent No.: US 6,386,593 B1
(45) Date of Patent: May 14, 2002

(54) DUAL-PLANE SEAL FOR FLUID-TIGHT CONDUIT CONNECTION

(75) Inventors: Robert J. Slais, West Bloomfield, MI (US); Johnny R. Blankenship, Allons, TN (US); Chhotubhai N. Patel, Farmington, MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/430,507

(22) Filed: Oct. 29, 1999

(51) Int. Cl.[7] .............................................. F16L 17/025
(52) U.S. Cl. ........................ 285/205; 277/626; 277/609; 285/124.1
(58) Field of Search .................... 285/205, 124.1, 285/FOR 118; 277/592, 595, 609, 627, 598, 626

(56) References Cited

U.S. PATENT DOCUMENTS

| | | | | |
|---|---|---|---|---|
| 2,152,630 A | * | 4/1939 | Balfe | |
| 3,042,248 A | * | 7/1962 | Krueger | |
| 3,053,544 A | * | 9/1962 | Gorsica | |
| 3,099,456 A | * | 7/1963 | Hopp | |
| 3,275,348 A | * | 7/1966 | Scott | |
| 4,103,901 A | * | 8/1978 | Ditcher | |
| 4,676,515 A | * | 6/1987 | Cobb | 277/235 |
| 4,796,896 A | * | 1/1989 | Anderson, Jr. | |
| 5,174,612 A | * | 12/1992 | Schnell | 285/205 |
| 5,228,702 A | * | 7/1993 | Browne et al. | |
| 5,375,851 A | * | 12/1994 | Mockenhaupt | |
| 5,544,902 A | * | 8/1996 | Belter | |
| 5,556,138 A | * | 9/1996 | Nakajima et al. | 285/205 |
| 5,853,201 A | * | 12/1998 | Izumi et al. | 285/205 |
| 5,958,571 A | * | 9/1999 | Omura | |
| 6,027,125 A | * | 2/2000 | Guest | |

* cited by examiner

Primary Examiner—Lynne E. Browne
Assistant Examiner—Tomlyne A Malcolm
(74) Attorney, Agent, or Firm—VanOphem & VanOphem, P.C.

(57) ABSTRACT

A dual-plane sealing configuration for a fluid-tight conduit connection that incorporates additional sealing areas and minimizes assembly misalignment. A gasket is mounted around a conduit, sandwiched between an end-form block and a receiver, and compressed therebetween using a fastener fitted through the end-form block and threaded into the receiver. The gasket has a formed pilot that pilots around the conduit and is sandwiched between the conduit and a chamfer in the receiver to establish a secondary seal. The gasket incorporates features such as a fold-over tab and a non-uniform embossment to counteract the cantilever behavior of the conduit connection.

20 Claims, 5 Drawing Sheets

DUAL-PLANE SEAL FOR FLUID-TIGHT CONDUIT CONNECTION

BACKGROUND OF THE INVENTION

1. Field of the Invention

The present invention generally relates to a device for improved sealing of a conduit connection. More particularly, the present invention relates to a dual-plane sealing configuration for connecting a tube to a port within an automotive air-conditioning component.

2. Description of the Prior Art

Prior to the present invention, many types of sealing configurations have been proposed for connecting a tube to another component of a fluid system. Perhaps most common was the use of a simple O-ring encircling an end of a tube mounted into a port. The tube would be connected to the port using a coaxial fastener that encircled and entrapped the tube. The coaxial fastener would then be screwed down over corresponding threads on the port—similar to a compression fitting—as is known in the art. Although this configuration was very simple and robust against leakage, its primary drawback was that it could not be assembled quickly enough for the modem day assembly line. In order to torque the fastener to the female port it was necessary to use hand tools, which was too time consuming. Therefore, devices such as teardrop block connections were developed.

The teardrop block connection involves a small mounting block having a teardrop-shaped profile. The teardrop block entraps the conduit through a conduit passage therein. Also, the teardrop block houses a fastener through another passage just offset from and parallel to the conduit passage. A simple bolt-style fastener is used to draw the teardrop block and conduit to the port, where the connection can be fastened quickly with a power tool. However, the teardrop block connection tends to be more susceptible to leakage than the coaxial fastener connection.

Accordingly, there are several reasons that teardrop block connections tend to leak. First, for packaging considerations, conduit ends are typically made very short to minimize the corresponding length of the port. As a result, the short conduit end tends not to pilot within the female port as well as a longer pilot would. Second, during final torque-down the teardrop block and conduit tend to misalign, cross-axially, relative to the female port. This misalignment is often the result of the cantilever nature of the teardrop design. That is, since the longitudinal axis of the fastener is not coaxially aligned with the conduit, but is instead offset, any torquing of the fastener often imparts a cantilever effect across the teardrop block. The cantilever effect results in a maximum hold-down force along the axis of the fastener and a minimum hold-down force at the opposite end of the teardrop block at the far edge of the conduit. Therefore the mounting block often does not mount squarely to the sealing surface and likewise the conduit does not mount squarely within the port. Such cross-axial misalignment results in slight abrasion to or insufficient "squeeze" on the O-ring, thus permitting fluid to leak by. Accordingly, such fluid leaks present a significant warranty problem to automobile manufacturers.

Figure 1:
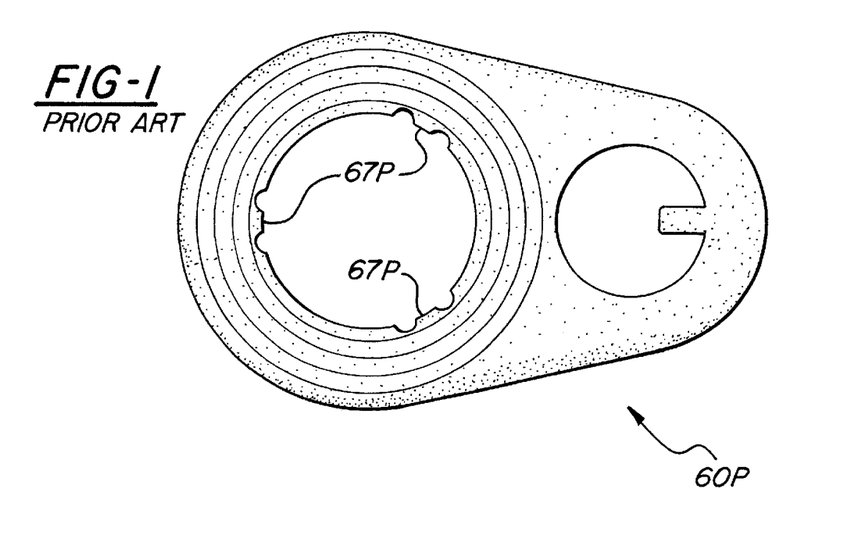
FIG. 1 is a top view of a planar seal according to the prior art wherein three equally spaced interference tabs are formed integral with an aperture.
Figure 2:
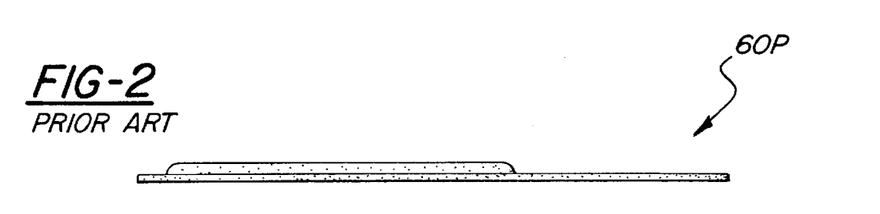
FIG. 2 is a front view of FIG. 1.

In response to this problem, component manufacturers have, in some applications, applied a gasket between the teardrop block and the port. FIGS. 1 and 2 illustrate a gasket 60P according to the prior art. Here, interference tabs 67P are used to help retain the gasket 60P around the conduit during shipping and assembly. However, while such a gasket may reinforce the sealing potential of the connection, the gaskets of the prior art introduce new problems. Because the gaskets are stamped from metal substrate, the interference tabs scratch and thereby create leak paths along the outer surface of the conduit as the gasket is assembled thereto. Furthermore, such gaskets incorporate no feature to counteract the inherent cantilever misalignment of typical end-form connections.

From the above, one can see that an improvement in the capability to seal a teardrop-shaped fluid connection is required. Therefore, what is needed is a sealing configuration that minimizes misalignment of the connection and incorporates additional areas of sealing within the connection.

SUMMARY OF THE INVENTION

According to the present invention there is provided a device that minimizes assembly misalignment and incorporates additional areas of sealing within the fluid-tight conduit connection. The fluid-tight conduit connection includes a conduit having a circumferential groove with a circumferential seal mounted therein. Further, an end-form block has a conduit passage through which the conduit is fitted and entrapped. Likewise, a planar seal has a formed pilot with an aperture through which the conduit is fitted. Furthermore, a receiver has a fluid passage into which the conduit is fitted, where the circumferential seal is compressed between the fluid passage and the conduit to establish a first primary seal. Similarly, the planar seal is compressed between the receiver and the end-form block to establish a second primary seal, and the formed pilot is sandwiched between the conduit and the receiver to establish a secondary seal. Finally, fastening members are included for fastening the end-form block to the receiver such that the planar seal is further compressed to complete the fluid-tight connection.

Additionally, the planar seal may include an embossment surrounding the aperture and following the periphery of the planar seal to establish a preload on the planar seal during assembly of the fluid-tight conduit connection. Similarly, the embossment may be greater in thickness near one end of the fluid-tight conduit connection than at an opposite end, so as to pre-seal one end of the fluid-tight conduit connection during assembly. Furthermore, the fastening members may include a stud and fastening nut with a conically-shaped washer overhanging the end-form block, to counterbalance alignment during assembly.

From the above, it can be seen that a significant advantage of the present invention is the introduction of an additional sealing area within the traditional conduit connection. The formed pilot of the planar seal provides the additional sealing area, thus establishing a secondary seal, in addition to the first and second primary seals.

Additionally, the conduit connection may include features that balance alignment of the end-form block and conduit to the receiver, thereby minimizing potential for leakage. The embossment of the planar seal or the conically-shaped oversize washer of the fastening members are features that counteract the inherent cantilever nature of an endform block connection.

Accordingly, it is an object of the present invention to provide an improved configuration for sealing a conduit connection.

It is another object of the present invention to provide a fluid-tight conduit connection with a planar seal that assembles smoothly over an end of a conduit without leaving scratches and leak paths on the conduit.

It is yet another object of the present invention to provide a fluid-tight conduit connection with a planar seal that yields an additional sealing area in the form of a formed pilot pinched between a receiver and an end-form block.

It is a further object of the present invention to provide a fluid-tight conduit connection with a planar seal that has a feature to help align a conduit to a port and counteract the inherent cantilever nature of an end-form block connection.

Additional objects, features, and advantages of the present invention will become apparent from a reading of the detailed description of the preferred embodiment taken in conjunction with the drawings appended hereto.

DETAILED DESCRIPTION OF THE PREFERRED EMBODIMENT

Disclosed is a device for sealing a fluid-tight conduit connection in an automobile air-conditioning system in which a novel gasket prevents refrigerant leaks. More specifically, the novel gasket incorporates a self-sealing aperture and pre-load or pre-seal features so as to form additional, more reliable seal areas.

While the present invention will be described in detail with respect to an automobile air-conditioning system, the present invention is also well suited to other applications, including but not limited to: steering, braking, and hydraulic systems; coolant lines; and other similar applications. Additionally, the novel gasket is depicted below in combination with an O-ring but may be effectively used as a sole sealing device. Furthermore, the term conduit covers tube, pipe, hose, and other conduit regardless of material. Accordingly, the present invention is not limited to only an automobile air-conditioning system.

Figure 3:
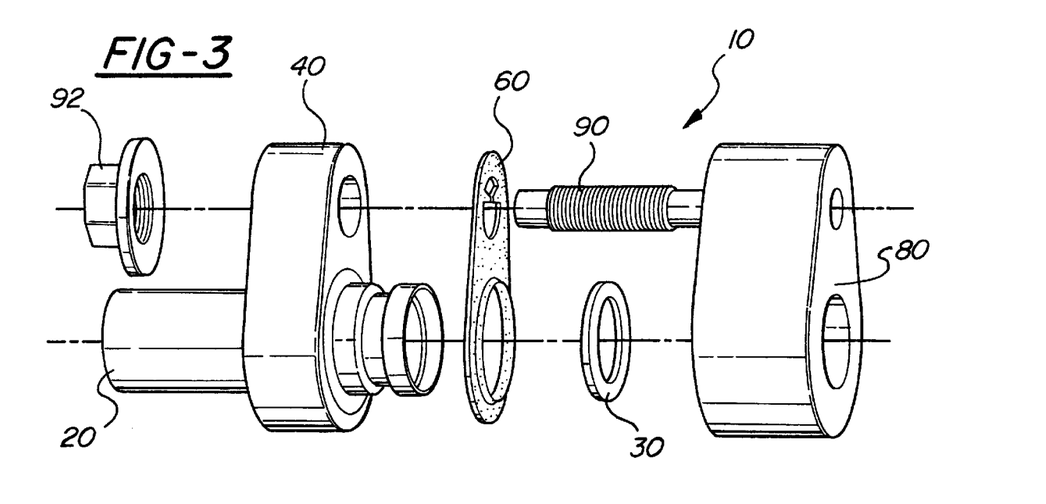
FIG. 3 is an exploded perspective view of a fluid-tight conduit connection in accordance with the present invention.

Referring now in detail to the Figures, there is illustrated in FIG. 3 an exploded view of an improved conduit connection 10 in accordance with the present invention. The conduit connection 10 primarily includes an end-form assembly embodying a conduit 20 entrapped within an end-form block 40, and further includes a planar seal such as a gasket 60 and a circumferential seal such as an O-ring 30 that seats in a circumferential groove 28 (shown in FIG. 5) in the conduit 20. The end-form assembly is inserted into a receiver 80 such as a female block or housing, and fastened down using a fastener such as a bolt, or a stud 90 and nut 92 combination.

Figure 4:
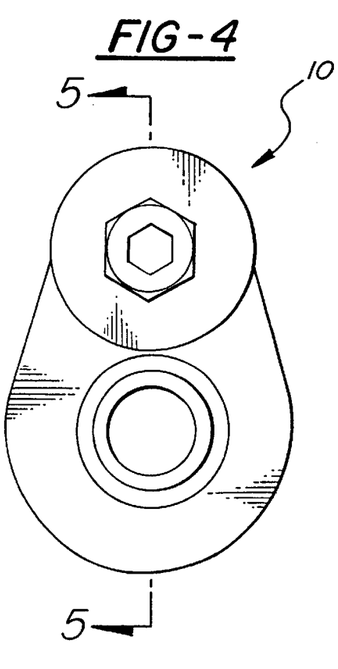
FIG. 4 is an end view of the exploded fluid-tight conduit connection of FIG. 3.
Figure 5:
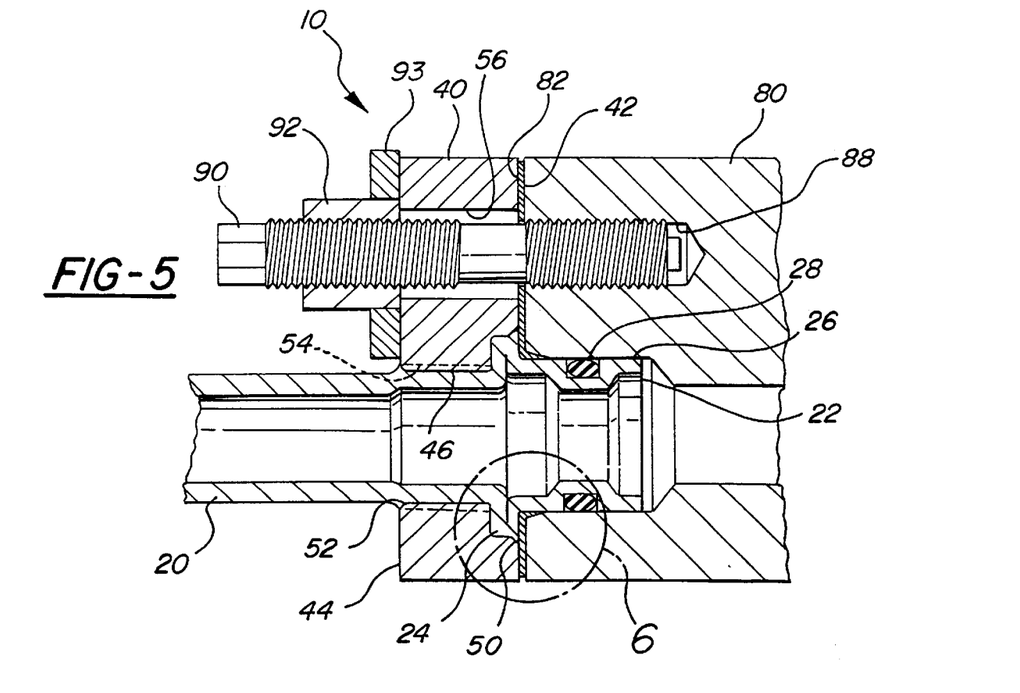
FIG. 5 is a cross-sectional assembled view of the fluid-tight conduit connection of FIG. 4, taken along line 5—5 thereof.
Figure 6:
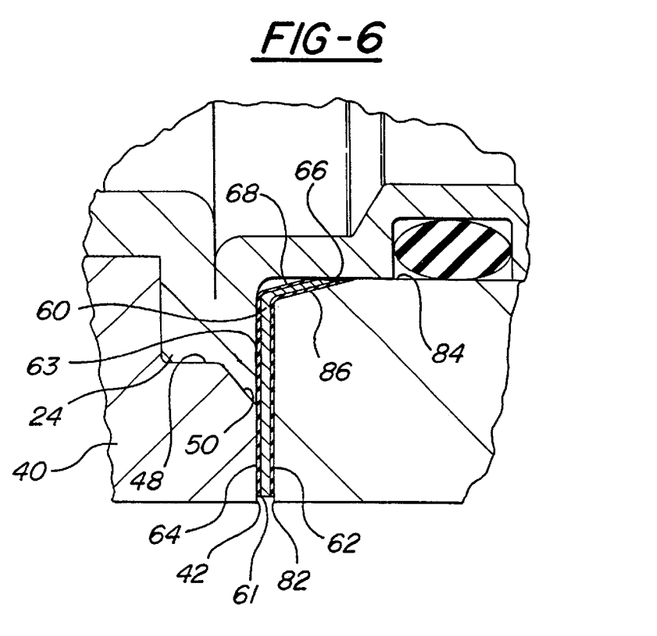
FIG. 6 is an enlarged section of circle 6 of FIG. 5.

Referring now to FIGS. 4 through 6, the conduit connection 10 of FIG. 3 is illustrated in assembled form. As best illustrated in FIG. 4, the conduit connection is preferably teardrop-shaped, but may take any other appropriate form. FIGS. 5 and 6 illustrate the end-form block 40 having a sealing surface 42 opposite a fastening surface 44 with a conduit passage 46 therebetween. The conduit passage 46 includes a counterbore 48 in the sealing surface 42 and also has a front chamfer 50. The passage further includes a rear chamfer 52 in the fastening surface 44 and also includes axial grooves 54 extending therethrough. The conduit 20 is formed tightly to the conduit passage 46 by inserting an end 22 of the conduit 20 into the conduit passage 46 and axially compressing the conduit 20 therein to form an upset bead 24 in the counterbore 48 to hold the conduit 20 to the end-form block 40. Consequently, a pilot diameter 26 and the circumferential groove 28 are formed between the end 22 and the upset bead 24 of the conduit 20.

Maintaining the upset bead 24 flush with or slightly higher in relation to the sealing surface 42 of the end-form block 40 is critical to the success of forming the fluid-tight seal. Accordingly, a unilateral height tolerance of 0.000" to 0.004" is maintained. Use of a thicker gasket than is shown in FIGS. 5 and 6 would permit a greater tolerance and possibly a negative bead height relative to the sealing surface 42. This configuration ensures that the upset bead will sufficiently compress or "pinch" the gasket at a pinch-point 63, to guarantee sufficient compression to complete the second primary seal, as seen in FIG. 6. As is known in the art, during end-forming a punch (not shown) strikes the conduit 20 and the end-form block 40 to compress the upset bead 24 flush with the sealing surface 42. In order to accommodate such a tight tolerance several features have been incorporated.

First, excess conduit material from the upset bead 24 forming would otherwise result in exceeding the 0.004" maximum dimension. Therefore, the front chamfer 50 is provided in the sealing surface 42 to enable excess conduit material to flow therein in order to maintain the tight unilateral tolerance. Second, the rear chamfer 52 is provided in the fastening surface 44 for flow of conduit material during the end-forming process. Third, the axial grooves 54 are provided for three reasons. One, conduit material interlocks with the axial grooves 54 to prevent relative rotation. Two, like the front and rear chamfers 50/52, the axial grooves 54 help take up excess conduit material to help meet the tight unilateral tolerance. Three, the axial grooves 54 permit fluid pressure and trapped air built up during compression to escape out the rear chamfer 52 and blow by the thin excess conduit material. This helps conduit material to flow during the end-forming process.

Still referring to FIGS. 5 and 6, there is illustrated the gasket 60 having a peripheral or circumferential edge 61, a front surface 62, a rear surface 64, and an aperture 66 therebetween. Surrounding the aperture 66 is a crown or formed pilot 68 as best seen in FIG. 6. The aperture 66 mounts over the end 22 of the conduit 20 onto the pilot diameter 26. Further, the receiver 80 has a sealing surface 82 with a fluid passage 84 therein having a chamfer 86. The conduit 20 mounts into the fluid passage 84 so that the gasket 60 mounts flat to the sealing surface 82 and so that the formed pilot 68 fits tightly between the conduit pilot diameter 26 and the receiver chamfer 86. Furthermore, the O-ring 30 is compressed between the circumferential groove 28 and the fluid passage 84 to form the first primary seal of the conduit connection 10. Finally, the conduit connection 10 is fastened together using the stud 90 passed through a fastener passage 56 and threaded into a threaded passage 88 in the receiver 80. The nut 92 torques down over the stud 90 to compress the gasket 60 around the upset bead 24 and at the formed pilot 68 to form the second primary seal and secondary seal, respectively.

FIGS. 6 through 9 best illustrate the gasket 60 of the present invention. The gasket is also preferably teardrop-shaped and made of a substrate 70 sandwiched between rubber coating 72. The substrate 70 is preferably aluminum but may be composed of any appropriate material. The rubber coating 72 is preferably nitrile but also may be composed of any appropriate material for sealing liquids or gases. At least one formed embossment 74 encircles the aperture 66 and continues on to surround a fastener hole 76. The embossment 74 serves to balance assembly alignment by pre-loading the conduit connection (not shown) and thereby ensuring contact and sealing around the entire periphery thereof, against fluid leakage.

Figure 9:
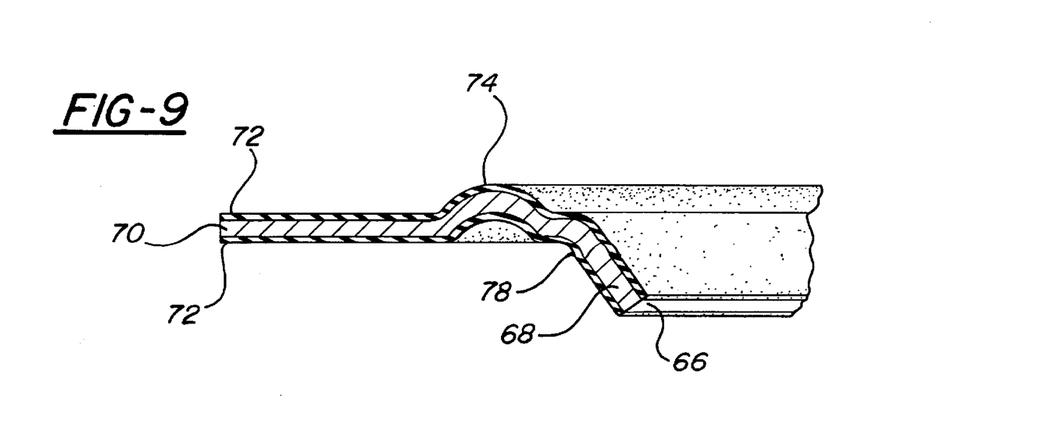
FIG. 9 is an enlarged cross-section of circle 9 of FIG. 8.

As is shown, the formed pilot 68 encircles the aperture 66. FIGS. 6 and 9 highlight the fact that, unlike the prior art, the gasket 60 of the present invention will not damage the pilot diameter or circumferential groove of the conduit (not shown). This is because the aperture 66 introduces no bare base material edge to the sensitive conduit. Instead, due to the geometry and rubber material of the formed pilot 68, the aperture 66 slides smoothly over the conduit (not shown). Therefore, no leak paths are generated from damage caused by any bare base material edge that may be left over from a stamping process. Additionally, the formed pilot 68 serves as a secondary seal where it is pinched between the conduit pilot diameter 26 and the receiver chamfer 86 as shown in FIG. 6. Further, the formed pilot 68 helps center the conduit to the port (not shown). During assembly, a tapered surface 78 on the formed pilot 68 contacts the chamfer in the fluid passage of the receiver (not shown). This helps keep the conduit 20 centered, thereby reducing side-loading and enabling a better and longer lasting fluid-tight seal.

Figure 10:
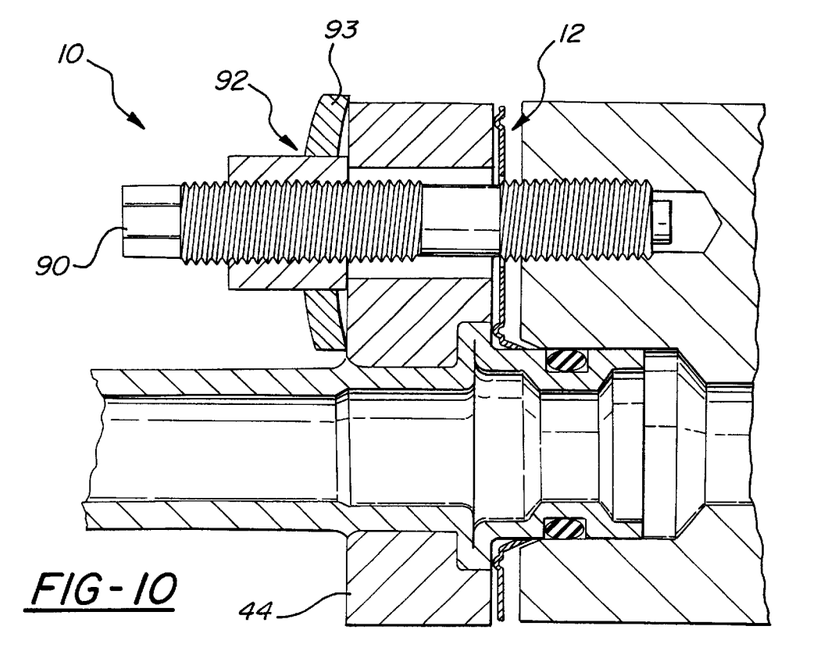
FIG. 10 is a cross-sectional view of a typical fluid-tight conduit connection prior to final torque down.
Figure 11:
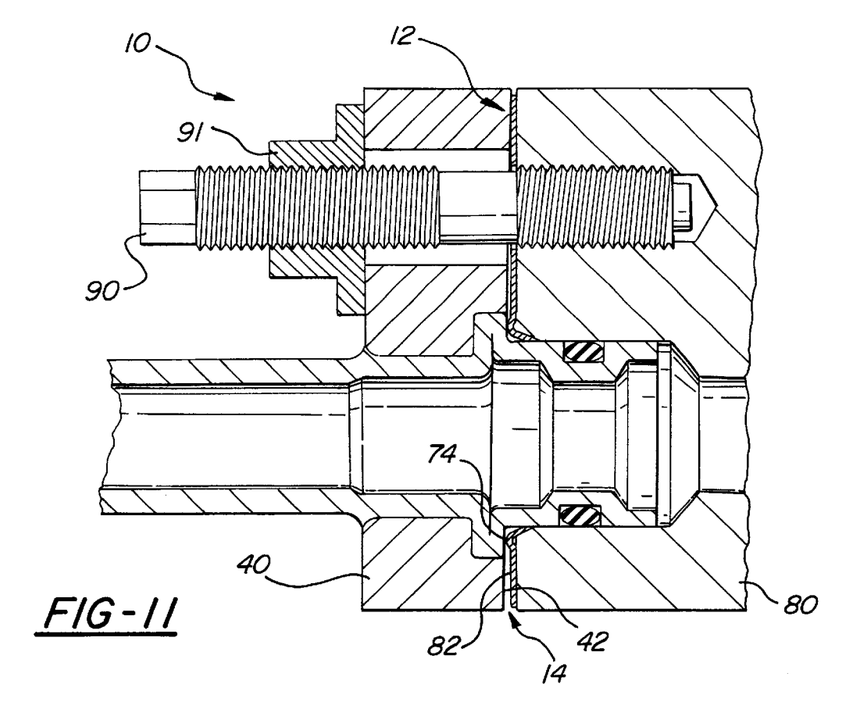
FIG. 11 is a cross-sectional view of a typical fluid-tight conduit connection after final torque down.

FIG. 10 illustrates the conduit connection 10 prior to final torque-down in an appropriately aligned condition. However, as is known in the art, during final torque-down the conduit connection 10 can become slightly misaligned as shown in FIG. 11. FIG. 11 illustrates the cantilever behavior of teardrop-shaped connections: that is, the farther away from the centerline of the stud 90 and a nut 91, the less hold down force there is. Normally, hold down force will be at a maximum near a fastener end 12 of the conduit connection 10 and at a minimum at a conduit end 14. This imbalance in hold down force can result in the exaggerated gap evident at the conduit end 14 of the conduit connection 10. The imbalance also causes misalignment of the pilot diameter 26 and O-ring 30. Therefore, a few alternative embodiments are discussed below that address this problem.

The first alternative embodiment to address the cantilever misalignment problem is illustrated in FIG. 10. Here the nut 92 is illustrated having a conical swivel washer 93. The conical swivel washer 93 has a radius greater than the radius of the connecting block at the fastener end. The outer diameter of the conical swivel washer 93 engages the fastening surface 44 between the fastener axis and the conduit axis but overhangs the end-form block 40 at the fastener end 12, as best seen in FIG. 4. This differential in engagement area results in a shift in the location of maximum hold down force from the fastener axis to a location somewhere between the fastener axis and the conduit axis. This shift in location thereby serves to decrease the cantilever of the conduit connection 10, improve assembly alignment, and increase sealability of the connection.

Figure 12:
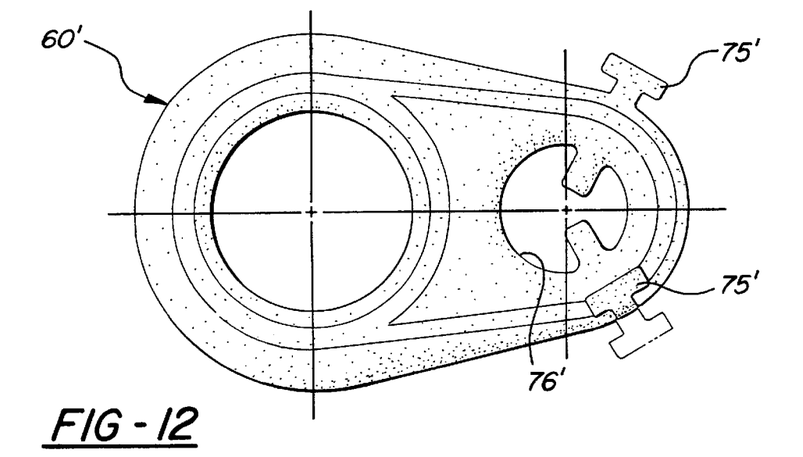
FIG. 12 is a top view of an alternate embodiment of the planar seal of the present invention.
Figure 14:
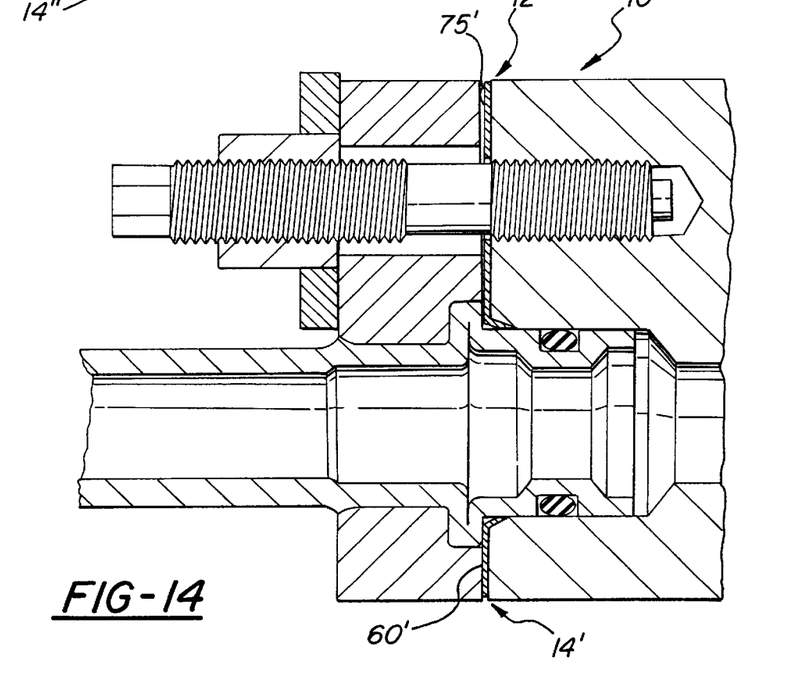
FIG. 14 is a cross-sectional view of a conduit connection just prior to torque-down and incorporating the planar seal of FIG. 12.

Similarly, FIG. 12 illustrates a gasket 60' that improves alignment, not by decreasing the cantilever effect, but instead by counterbalancing it. Accordingly, the gasket 60' incorporates fold-over tabs 75' near a fastener hole 76'. The fold-over tabs 75' are folded onto the gasket 60' before it is assembled with the other components, thereby creating a double layer of gasket material. FIG. 14 illustrates this gasket 60' as assembled to the conduit connection 10'. The fold over tabs 75' must be located outboard of the transverse centerline of the fastener hole 76' at the fastener end 12' of the conduit connection 10', as shown in FIG. 14. The fold-over tabs 75' act to pre-load the fastener end 12' of the conduit connection 10' and thereby counteract the cantilever and compensate for the inherent imbalance of axial force on the far conduit end 14'. Consequently, appropriate alignment is achieved, as seen in FIG. 5.

Figure 13:
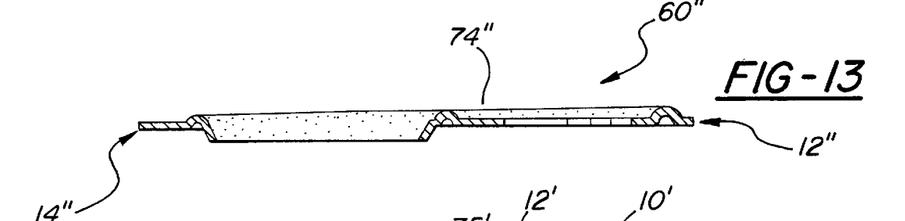
FIG. 13 is a cross-sectional view of another alternate embodiment of the planar seal of the present invention.

Likewise, FIG. 13 also illustrates a gasket 60" according to an alternative embodiment of the present invention. This gasket 60" incorporates a modified embossment 74" that is formed higher at the conduit end 14" than at the fastener end 12". Unlike the configuration of the gasket 60' of FIGS. 12 and 14, this gasket does not counterbalance the cantilever effect, but instead pre-seals the conduit end 14" to counteract the cantilever effect.

Accordingly, a significant advantage of the present invention is that a significantly lower leak rate of the conduit connection is realized. This is a result of using a conduit connection that incorporates features such as a gasket having a formed pilot, a gasket having anti-cantilever features, and an anti-cantilever fastener. To evaluate the decrease in leak rate that can be achieved in accordance with the present invention, the applicants developed and completed a series of thirty-day, 24 hour/day leak rate tests. The tests included daily temperature variations from 127° C. (260° F.) to −40° C. (−40° F.) with varying vibration inputs to the connectors. One pair of tests compared a group of HNBR O-ring conduit connections against a group of dual-plane seal conduit connections that each had an HNBR O-ring and a nitrile axial sealing gasket. Both tests used ½" tube connections on the high side of the system, similar to FIGS. 3 through 6. Also, both tests were performed using HFC R134a refrigerant. Leak rate data was captured at 127° C. (260° F.) averaging 3172 kPA (460 psi), otherwise known as "worst case customer usage condition", and also at 100° C. (212° F.) averaging 2690 kPA (390 psi). Finally, the tests were performed using a gas analyzer with measurement accuracy of +/−0.2 grams/year.

The first test evaluated the prior art gasket by comparing conduit connections with only a single O-ring against conduit connections with a single O-ring and a nitrile coated aluminum gasket having a double embossment and interference tabs as shown in FIGS. 1 and 2. At 127° C. the single O-ring samples averaged 7.2 g/yr, and the gasket/O-ring samples averaged 4.2 g/yr—for a reduction of 42%. At 100° C. the single O-ring samples averaged 2.8 g/yr while the gasket/O-ring samples averaged 0.6 g/yr—for a reduction of 79%.

Figure 7:
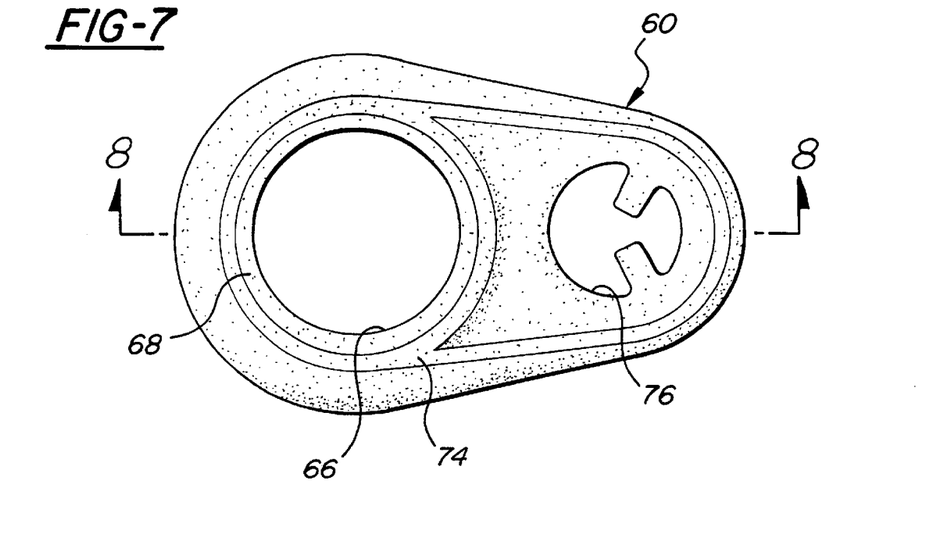
FIG. 7 is a top view of a planar seal according to the present invention.
Figure 8:
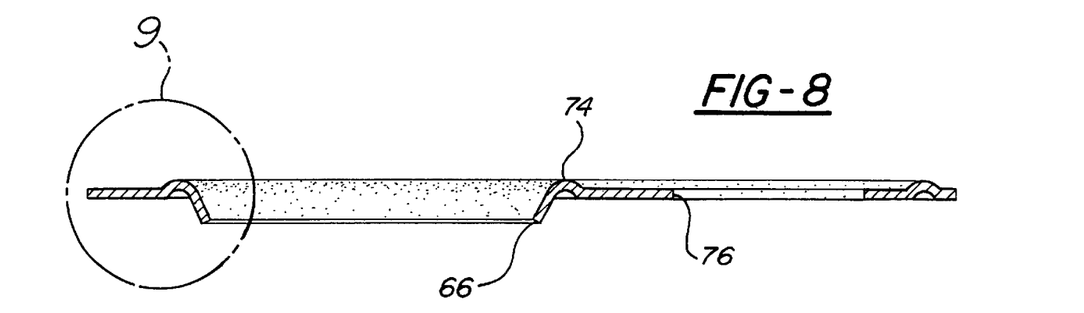
FIG. 8 is a cross-sectional view taken along line 8—8 of FIG. 7.

Next, the second test evaluated the novel gasket by comparing conduit connections having only the single O-ring against conduit connections having both the single O-ring and a nitrile coated aluminum gasket having a combined embossment and the formed pilot as shown in FIGS. 7 through 9. At 127° C. the single O-ring samples averaged 9.7 g/yr, while the gasket/O-ring samples averaged 2.0 g/yr—for a reduction of 79%. At 100° C. the single O-ring samples averaged 2.7 g/yr, while the gasket/O-ring samples averaged 0.0 g/yr—for a leak rate reduction of 100%.

Accordingly, a comparison of the two tests yields the following analysis. At 127° C. the prior art gasket samples averaged 4.2 g/yr, while the novel gasket samples averaged 2.0 g/yr—for a reduction of 52%. At 100° C. the prior art gasket samples averaged 0.6 g/yr, while the novel gasket samples averaged 0.0 g/yr—for a leak rate reduction of 100%. Therefore, with regard to relative leak rate performance, the novel gasket performs at least twice as well as the prior art gasket.

Another significant advantage of the present invention is that the formed pilot on the gasket has a centering effect on the assembly, thereby minimizing leakage due to O-ring compression variation. During assembly, the tapered portion of the formed pilot pilots to the chamfer of the receiver to enable the tube to self-align to the receiver, thereby reducing the risk of degradation and under-compression of the O-ring. This self-aligning action also constrains and centers the tube within the receiver such that the tube is prevented from moving laterally within the receiver. Preventing lateral movement of the tube prevents side-loading the O-rings and leads to a more even compressive load upon the O-rings within the passage of the receiver.

While the invention has been described in terms of a preferred embodiment, it is apparent that other forms could be adopted by one skilled in the art. Accordingly, the scope of the present invention is to be limited only by the following claims.

What is claimed is:

1. A fluid-tight conduit connection, comprising:
   a conduit;
   an end-form block having a conduit passage therethrough through which said conduit is entrapped;
   a planar seal having a formed pilot thereon with an aperture therethrough through which said conduit is fitted, said planar seal having a periphery;
   a receiver having a fluid passage therethrough into which said conduit is fitted, said planar seal being compressed between said receiver and said end-form block for establishing a primary seal, and said formed pilot extending into said receiver and being sandwiched between said conduit and said fluid passage to establish a secondary seal; and
   means for fastening said end-form block to said receiver such that said planar seal is further compressed to complete said fluid-tight conduit connection.

2. The fluid-tight conduit connection of claim 1, wherein said planar seal comprises:
   a substrate with opposite surfaces and a circumferential edge therearound; and
   a rubber coating on each of said opposite surfaces of said substrate, whereby said circumferential edge of said substrate remains exposed.

3. The fluid-tight conduit connection of claim 2, wherein said planar seal further comprises:
   an embossment surrounding said aperture and following said periphery of said planar seal to establish a pre-seal during assembly of said fluid-tight conduit connection.

4. The fluid-tight conduit connection of claim 2, wherein said substrate is composed of aluminum, and said rubber coating is composed of nitrile material.

5. The fluid-tight conduit connection of claim 1, wherein said means for fastening includes a fastener passing through said end-form block and threaded into said receiver.

6. The fluid-tight conduit connection of claim 5, wherein said fastener comprises:
   a stud passing through said end-form block and threaded into said receiver; and
   a fastening nut threading onto said stud, said fastening nut being torqued against said end-form block.

7. The fluid-tight conduit connection of claim 6, wherein said fastening nut has a conical washer portion overhanging said end-form block.

8. A fluid-tight conduit connection, comprising:
   a conduit having an end, an upset bead adjacent said end, and a circumferential groove therebetween;
   a circumferential seal mounting over said end and in said circumferential groove of said conduit;
   an end-form block having a fastening surface, a sealing surface, and a conduit passage therebetween, said conduit passage having a counterbore in said sealing surface through which said conduit extends and in which said upset bead of said conduit is entrapped;
   a planar seal having a formed pilot thereon with an aperture therethrough through which said end of said conduit passes, said planar seal having a periphery;
   a receiver having a fluid passage therethrough into which said end of said conduit is fitted, said circumferential seal being compressed by said fluid passage to establish a first primary seal, said planar seal being compressed between said end-form block and said receiver to establish a second primary seal, and said formed pilot extending into said receiver and being sandwiched between said conduit and said fluid passage to establish a secondary seal; and
   means for fastening said end-form block to said receiver, said fastening means mounting to said end-form block and said receiver such that said planar seal is further compressed to complete said fluid-tight conduit connection.

9. The fluid-tight conduit connection of claim 8, wherein said planar seal comprises:
   a substrate having opposite surfaces and a circumferential edge therearound; and
   a rubber coating on each of said opposite surfaces of said substrate, whereby said circumferential edge of said substrate remains exposed.

10. The fluid-tight conduit connection of claim 9, wherein said planar seal further comprises:
    an embossment surrounding said aperture and following said periphery of said planar seal to establish a pre-seal during assembly of said fluid-tight conduit connection.

11. The fluid-tight conduit connection of claim 8, wherein said upset bead of said conduit is mounted flush with said sealing surface of said end-form block within a positive unilateral tolerance to create a pinch point on said planar seal to ensure planar sealing.

12. The fluid-tight conduit connection of claim 11, wherein said counterbore of said end-form block has a front chamfer therein to permit excess material from said upset bead of said conduit to flow therein to ensure repeatability of said positive unilateral tolerance.

13. The fluid-tight conduit connection of claim 11, wherein said conduit passage of said end-form block has a rear chamfer therein to permit excess material from said upset bead of said conduit to flow therein to ensure repeatability of said positive unilateral tolerance, said rear chamfer further permitting said conduit to positively lock to said end-form block to keep said end-form block retained on said conduit during shipping.

14. The fluid-tight conduit connection of claim 11, wherein said conduit passage of said end-form block has axial grooves therethrough to permit escape of fluid pressure during assembly of said conduit to said end-form block.

15. A fluid-tight conduit connection of teardrop shape with a fastener end and a conduit end opposite said fastener end, said fluid-tight conduit connection comprising:

a conduit having an end and a circumferential groove adjacent said end;

a circumferential seal mounted in said circumferential groove of said conduit;

an end-form block having a fastening surface, a sealing surface opposite said fastening surface, and a conduit passage therebetween through which said conduit is entrapped;

a planar seal having a front surface, a rear surface opposite said front surface, an aperture therebetween, and a formed pilot surrounding said aperture, said conduit being fitted through said aperture;

a receiver having a sealing surface with a fluid passage therein into which said conduit is fitted, said circumferential seal being compressed by said fluid passage to establish a first primary seal, said planar seal being compressed between said sealing surface of said end-form block and said sealing surface of said receiver to establish a second primary seal, and said formed pilot extending into said receiver and being sandwiched between said conduit and said fluid passage to establish a secondary seal; and means for fastening said end-form block to said receiver such that said planar seal is further compressed to complete said fluid-tight conduit connection.

16. The fluid-tight conduit connection of claim 15, wherein said means for fastening includes a fastener passing through said end-form block and threaded into said receiver.

17. The fluid-tight conduit connection of claim 16, wherein said planar seal further has at least one tab at said fastener end, said at least one tab being folded onto said planar seal so as to double the thickness of said planar seal at said fastener end, said at least one tab pre-loading said conduit end so as to balance alignment of said fluid-tight conduit connection during assembly in response to otherwise uneven alignment of said conduit in said fluid passage of said receiver.

18. The fluid-tight conduit connection of claim 16, wherein said planar seal further includes an embossment, said embossment being of greater thickness near said conduit end than said fastener end to establish a pre-seal at said conduit end so as to ensure sealing of said fluid-tight conduit connection during assembly in response to otherwise uneven alignment of said conduit in said fluid passage of said receiver.

19. A planar seal comprising a front surface, a rear surface opposite said front surface, and an aperture therebetween, said planar seal further comprising a peripheral surface, a formed pilot surrounding said aperture and an embossment surrounding said aperture and following said peripheral surface, said formed pilot extending in a direction away from one of said front and rear surfaces, said formed pilot further providing a seal for a connection.

20. A planar seal as claimed in claim 19, further comprising:

a substrate layer having opposing surfaces and a circumferential edge therearound; and a rubber coating. on each of said opposing surfaces of said substrate layer, whereby said circumferential edge of said substrate layer remains exposed.

\* \* \* \* \*